US009725036B1

(12) United States Patent
Tarte

(10) Patent No.: US 9,725,036 B1
(45) Date of Patent: Aug. 8, 2017

(54) WAKE-UP ALERTS FOR SLEEPING VEHICLE OCCUPANTS

(71) Applicant: Toyota Motor Engineering & Manufacturing North America, Inc., Erlanger, KY (US)

(72) Inventor: Christopher T. Tarte, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 12 days.

(21) Appl. No.: 15/195,779

(22) Filed: Jun. 28, 2016

(51) Int. Cl.
*B60Q 9/00* (2006.01)
*B60H 1/00* (2006.01)
*B60W 40/08* (2012.01)

(52) U.S. Cl.
CPC ........... *B60Q 9/00* (2013.01); *B60H 1/00742* (2013.01); *B60W 40/08* (2013.01)

(58) Field of Classification Search
CPC ...... G06K 9/00845; G08B 21/06; B60Q 9/00; B60H 1/00742; B60W 40/08
See application file for complete search history.

(56) References Cited

U.S. PATENT DOCUMENTS

| | | | | |
|---|---|---|---|---|
| 5,729,619 A | * | 3/1998 | Puma | B60K 28/063 382/115 |
| 8,880,270 B1 | * | 11/2014 | Ferguson | B60W 30/00 701/23 |
| 2001/0025889 A1 | * | 10/2001 | Salberg | B60H 1/2206 237/12.1 |
| 2002/0145512 A1 | * | 10/2002 | Sleichter, III | G08B 21/06 340/407.1 |
| 2005/0052348 A1 | * | 3/2005 | Yamazaki | G02B 27/01 345/44 |
| 2008/0291032 A1 | * | 11/2008 | Prokhorov | B60K 28/066 340/576 |
| 2011/0210867 A1 | * | 9/2011 | Benedikt | G08G 1/01 340/905 |
| 2012/0083960 A1 | * | 4/2012 | Zhu | G05D 1/0214 701/23 |
| 2014/0231166 A1 | * | 8/2014 | Miller | B60W 40/08 180/272 |

(Continued)

OTHER PUBLICATIONS

Newcomb, "Don't Believe the Polls: Self-Driving Cars Are Inevitable", PCMag.com, Retrieved from the Internet: <http://www.pcmag.com/article2/0,2817,2499214,00.asp>, Retrieved Mar. 14, 2016, dated Feb. 12, 2016 (16 pages).

*Primary Examiner* — Courtney Heinle
(74) *Attorney, Agent, or Firm* — Christopher G. Darrow; Darrow Mustafa PC

(57) ABSTRACT

A vehicle can be configured to attempt to awaken a sleeping occupant when certain wake-up events have occurred. It can be determined whether a wake-up event has occurred. In one or more arrangements, the wake-up event can relate to the refueling of the vehicle (e.g., fuel level or recharge level). Sensor data relating to a vehicle occupant can be acquired. Based on the acquired sensor data, it can be determined whether the vehicle occupant is sleeping. Responsive to determining that the vehicle occupant is sleeping, the vehicle can cause a wake-up alert to be presented within the vehicle. The wake-up alert can be a visual, audial, and/or haptic wake-up alert.

22 Claims, 4 Drawing Sheets

(56) References Cited

U.S. PATENT DOCUMENTS

| | | | | |
|---|---|---|---|---|
| 2014/0316607 A1* | 10/2014 | Le | ............................ | B60R 16/037 701/1 |
| 2015/0066282 A1* | 3/2015 | Yopp | ...................... | G05D 1/0061 701/24 |
| 2015/0094914 A1* | 4/2015 | Abreu | .................. | B60H 1/00742 701/41 |
| 2015/0328985 A1* | 11/2015 | Kim | ..................... | H04N 5/23229 180/272 |
| 2016/0001781 A1* | 1/2016 | Fung | ...................... | G06F 19/345 701/36 |
| 2016/0009175 A1* | 1/2016 | McNew | ............... | H04N 13/0484 340/438 |
| 2016/0097645 A1* | 4/2016 | Davidsson | ............... | G01C 21/26 701/409 |

* cited by examiner

WAKE-UP ALERTS FOR SLEEPING VEHICLE OCCUPANTS

FIELD

The subject matter described herein relates in general to vehicles that have an autonomous operational mode and, more particularly, to the operation of such vehicles.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of stationary and dynamic objects in the environment. Sensor data from multiple sensor types can be used to provide a detailed understanding of the objects in the environment, including the speed of such objects. The computing systems are configured to process the detected information to determine how to navigate and/or maneuver the vehicle through the surrounding environment.

SUMMARY

In one respect, the present disclosure is directed to a method of alerting a sleeping occupant of a vehicle. The method can include determining whether a wake-up event has occurred. The wake-up event can be related to refueling of the vehicle. The method can include acquiring data relating to a vehicle occupant. The method can include determining whether the vehicle occupant is sleeping based on the acquired data relating to the vehicle occupant. The method can include, responsive to determining that the vehicle occupant is sleeping, causing an occupant wake-up alert to be presented within the vehicle.

In another respect, the present disclosure is directed to a sleeping occupant alert system for a vehicle. The system can include one or more sensors configured to acquire data relating to a vehicle occupant. The system can include a processor operatively connected to the one or more sensors. The processor can be programmed to initiate executable operations. The executable operations can include determining whether a wake-up event has occurred. The wake-up event can be related to refueling of the vehicle. The executable operations can include determining whether a vehicle occupant is sleeping based on the data relating to the vehicle occupant acquired by the one or more sensors. The executable operations can include, responsive to determining that the vehicle occupant is sleeping, causing an occupant wake-up alert to be presented within the vehicle.

DETAILED DESCRIPTION

Figure 1:
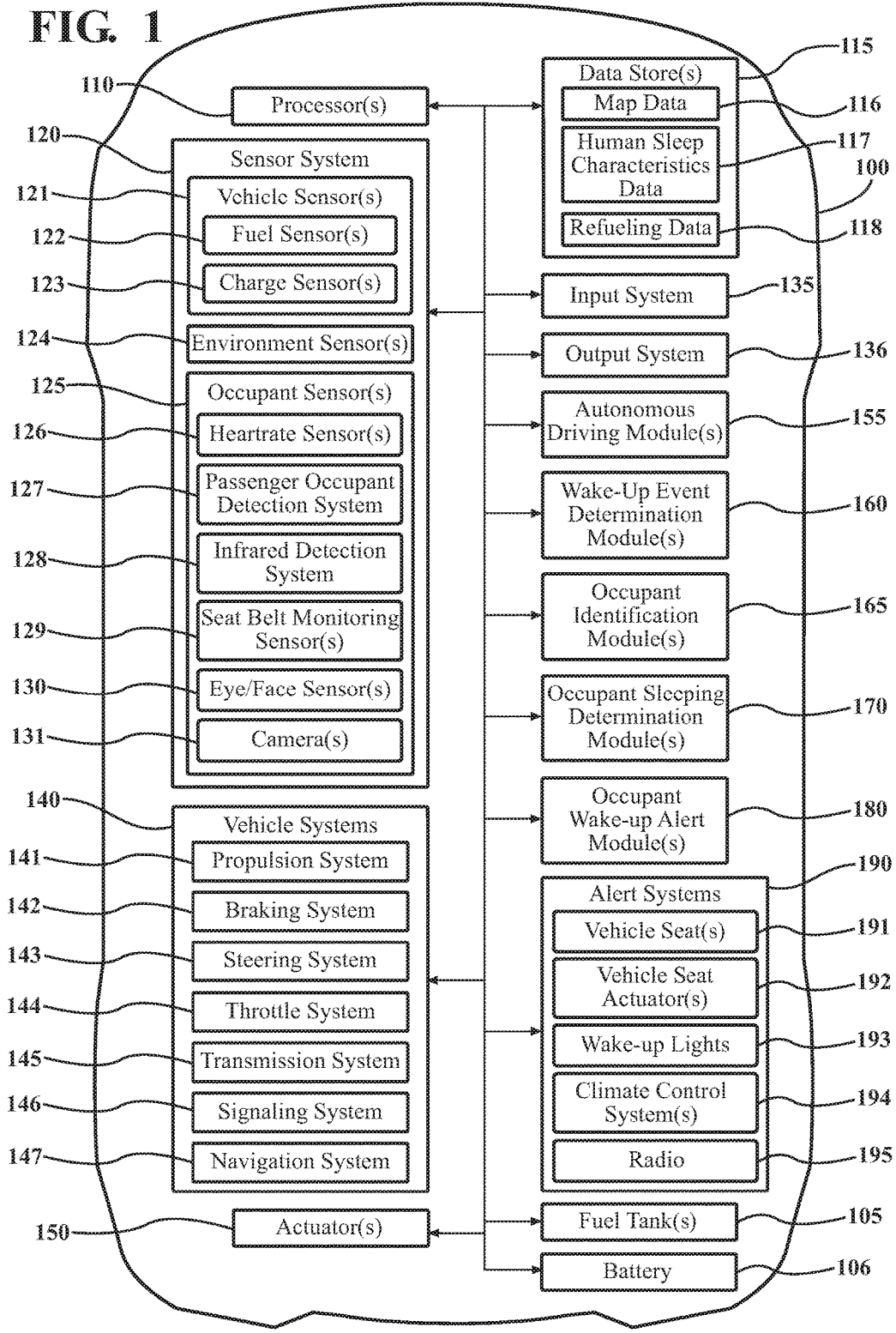
FIG. 1 is an example of a vehicle configured to provide a wake-up alert to a sleeping vehicle occupant when a wake-up event is determined to have occurred.

This detailed description relates to waking a sleeping occupant of a vehicle. While the vehicle is in operation, it can be determined whether a wake-up event has occurred. In some instances, the wake-up event can be related to refueling or recharging of the vehicle. Data relating to a vehicle occupant can be acquired using one or more sensors. It can be determined whether the vehicle occupant is sleeping based on the acquired data relating to the vehicle occupant. In response to determining that the vehicle occupant is sleeping, an occupant wake-up alert can be caused to be presented within the vehicle. The present detailed description relates to systems, methods and computer program products that incorporate one or more of such features. In at least some instances, such systems, methods and computer program products can improve the performance and/or the safe operation of a vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

In one or more arrangements, the vehicle 100 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the vehicle 100 can be highly automated or completely automated.

The vehicle 100 can have a plurality of autonomous or semi-autonomous operational modes. For instance, the vehicle 100 can have an unmonitored autonomous operational mode in which or more computing systems are used to navigate and/or maneuver the vehicle along a travel route with no input or supervision required from a human driver. The vehicle 100 can have a monitored autonomous operational mode in which one or more computing systems are used to navigate and/or maneuver the vehicle with at least some human driver supervision required. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. One example of a semi-autonomous operational mode is when an adaptive cruise control system is activated. In such case, the speed of a vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g., by depressing the brake pedal to reduce the speed of the vehicle), the adaptive cruise control system is deactivated and the speed of the vehicle is reduced.

The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode.

The vehicle 100 can be configured to be switched between the various operational modes, including between any of the above-described operational modes. Such switching can be implemented in any suitable manner, now known or later developed. The switching can be performed automatically, selectively, or it can be done responsive to receiving a manual input or request.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100. For instance, the processor(s) 110 can be an electronic control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, lane direction(s), lane use(s), structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can include terrain and/or elevation data. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the one or more data stores 115 can include human sleep characteristics data 117. In one or more arrangements, the human sleep characteristics data 117 can be associated with a sleep condition of a vehicle occupant (e.g., the driver and/or other passenger). The human sleep characteristics data 117 can be associated with other inattentive conditions of a vehicle occupant (e.g., drowsy, distracted, groggy, impaired, sleepy, inattentive, etc.). Non-limiting and non-exhaustive examples of the human sleep characteristics data 117 can include heartrate, eyes open or closed, head position, seat belt condition, eye movements, snoring, breathing patterns, seat position, brain activity, etc. For example, a slow heartrate relative to a predetermined heartrate threshold can indicate that the person is sleeping or is inattentive. As another example, closed eyes can indicate that a vehicle occupant is sleeping. As another example, certain head positions can indicate that a vehicle occupant is sleeping or is inattentive. For example, if a vehicle occupant's head that is not facing the travel direction of the vehicle.

As a further example, the sound of snoring can indicate that a vehicle occupant is sleeping. As still another example, certain breathing patterns can indicate that a vehicle occupant is sleeping. The human sleep characteristics data 117 can include one or more snoring profile, breathing profiles and/or apnea profiles, or other audio profiles indicative of sleeping. Still further, a seat position can indicate that a vehicle occupant is sleeping if, for example, a back of the vehicle seat is angled backward at an angle relative to a base of the vehicle seat that is greater than a predetermined seat angle threshold (e.g., about 90 degrees or greater, about 95 degrees or greater, about 100 degrees or greater, about 105 degrees or greater, about 110 degrees or greater, about 115 degrees or greater, about 120 degrees or greater, about 125 degrees or greater, about 130 degrees or greater, about 135 degrees or greater, about 140 degrees or greater, etc.). The human sleep characteristics data 117 can include one or more seat angle profiles indicative of sleeping. The human sleep characteristics data 117 can include one or more brain wave profiles that are indicative of sleeping. The human sleep characteristics data 117 can include one or more skeletal muscle activity profiles that are indicative of sleeping. The human sleep characteristics data 117 can include any other suitable physiological indicators or other indicators of sleep.

The one or more data stores 115 can include vehicle refueling data 118. The vehicle refueling data 118 can include information (e.g., location information and/or fuel type information) related to refueling stations. The vehicle refueling data 118 can be provided by a vehicle occupant (e.g., driver-identified) and/or by some other entity. In one or more arrangements, the vehicle refueling data 118 can include driver-preferences relating to refueling stations (e.g., a particular grade of fuel, a particular brand of fuel, a particular type of refueling station, etc.). In some arrangements, the driver can identify his or her home address as including a recharging station, identify various refueling stations not present in remote databases, such as refueling or recharging stations present at a work location of the driver, or otherwise input information regarding preferred refueling stations that can impact the selection of refueling stations made herein. Any additional vehicle refueling data 118 provided by the driver and/or other entity can improve the accuracy the refueling station selections offered by arrangements described herein.

In some instances, at least a portion of the map data 116, the human sleep characteristics data 117, the refueling data 118, and/or other data can be located in one or more data stores 115 located onboard the vehicle 100. Alternatively or in addition, at least a portion of the map data 116, the human sleep characteristics data 117, the refueling data 118, and/or other data can be located in one or more data stores 115 that are located remote from the vehicle 100. For example, one or more of the data stores 115 can be located on a remote server. The remote server can be communicatively linked to the vehicle 100 through one or more communication networks.

The data store(s) 115 can be communicatively linked to one or more elements of the vehicle 100 through one or more communication networks. As used herein, the term "communicatively linked" can include direct or indirect connections through a communication channel or pathway or another component or system. A "communication network" means one or more components designed to transmit and/or receive information from one source to another. The data store(s) 115 and/or one or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

As noted above, the vehicle 100 can include the sensor system 120. The sensor system 120 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1).

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can detect, determine, assess, monitor, measure, quantify and/or sense information about the vehicle 100 itself (e.g., position, orientation, speed, etc.). In one or more arrangements, the vehicle sensor(s) 121 can include one or more fuel sensors 122. The one or more fuel sensors 122 can detect a current level, quantity, volume, and/or amount of fuel in a fuel tank 105 of the vehicle 100, or data acquired by the one or more fuel sensors 122 can be used to determine a current level, quantity, volume, and/or amount of fuel in a fuel tank 105 of the vehicle 100. While this example refers to traditional vehicular fuels (e.g., diesel or gasoline), the vehicle 100 can alternatively or additionally be powered by any energy source, such as batteries, compressed gas, fuel cell, etc. References to fuel levels and fuel systems throughout this disclosure can thus refer to any energy source in use by the vehicle 100. For example, the vehicle 100 can be an electric vehicle. In such case, the current fuel level can refer to the current charge level. In one or more arrangements, the vehicle sensor(s) 121 can include one or more charge sensors 123. The one or more charge sensors 123 can detect a current level, quantity, and/or amount of charge or a battery 106 of the vehicle 100, or data acquired by the one or more charge sensors 123 can be used to determine a current level, quantity, and/or amount of charge in a battery 106 of the vehicle 100.

Alternatively or in addition, the sensor system 120 can include one or more environment sensors 124 configured to acquire, detect, determine, assess, monitor, measure, quantify and/or sense driving environment data. "Driving environment data" includes and data or information about the external environment in which a vehicle is located or one or more portions thereof. For example, the one or more environment sensors 124 can detect, determine, assess, monitor, measure, quantify and/or sense obstacles in at least a portion of the external environment of the vehicle 100 and/or information/data about such obstacles. Such obstacles may be stationary objects and/or dynamic objects. The one or more environment sensors 124 can detect, determine, assess, monitor, measure, quantify and/or sense other things in the external environment of the vehicle 100, such as, for example, lane markers, signs, traffic lights, traffic signs, lane lines, crosswalks, curbs proximate the vehicle 100, off-road objects, etc. In one or more arrangements, the one or more environment sensors 124 can include a global navigation satellite system (GNSS), a global positioning system (GPS), a navigation system (which can be the navigation system 147 described below), and/or other suitable sensors.

In one or more arrangements, the environment sensors 124 can include one or more radar sensors, one or more LIDAR sensors, one or more sonar sensors, one or more cameras, and/or one or more ranging sensors. Such sensors can be used to detect, determine, assess, monitor, measure, quantify and/or sense, directly or indirectly, the presence of one or more obstacles in the external environment of the vehicle 100, the position or location of each detected obstacle relative to the vehicle 100, the distance between each detected obstacle and the vehicle 100 in one or more directions (e.g., in a longitudinal direction, a lateral direction and/or other direction(s)), the elevation of each detected obstacle, the speed of each detected obstacle and/or the movement of each detected obstacle.

The vehicle 100 can include one or more occupant sensors 125. The occupant sensor(s) 1 can be configured to detect, determine, assess, monitor, measure, quantify and/or sense information about a vehicle occupant and, more particularly, information indicative of whether the vehicle occupant is sleeping. In one or more arrangements, the occupant sensor(s) 125 can include one or more heartrate sensors 126, one or more occupant detection sensors 127 (e.g., occupant presence, location, etc.), one or more infrared detection systems 128, one or more seat belt monitoring sensors 129, one or more eye and/or face sensor(s) 130, one or more breathing sensors, one or more camera(s) 131, one or more microphones, one or more blood pressure sensors, one or more eye movement sensors, one or more eyelid movement sensors, one or more brain wave sensors, one or more brain activity sensors, a galvanic skin response (GSR) monitor, an electroencephalogram (EEG), an electrocardiograph (ECG), an electromyograph (EMG), electrooculograph (EOG), and/or an electronystagmograph (ENG), just to name a few possibilities.

In one or more arrangements, the occupant sensor(s) 125 can include one or more biometric identification systems, including, for example, retinal, iris, facial, palm, fingerprint, voice and/or other biometric recognition technologies to identify the current driver of the vehicle 100. The occupant sensor(s) 125 can include a suitable camera (e.g., any of the cameras described above in connection with the sensor system 120), scanner, sensor, other hardware and/or software for retinal, iris, facial, palm, fingerprint, voice, and/or other biometric recognition. The occupant sensor(s) 125 can include one or more sensors (e.g., pressure sensors) to directly or indirectly detect when a vehicle occupant is physically engaging one or more vehicle components. For instance, such sensors can detect when a vehicle occupant is gripping a steering wheel of the vehicle, when a vehicle occupant is turning the steering wheel, applying pressure to a brake pedal, applying pressure to a gas pedal, and/or engaging a turn signal, just to name a few possibilities.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100 and/or one or more sensors can be located so as to be exposed to the exterior of the vehicle 100.

Returning to FIG. 1, the vehicle 100 can include an input system 135. An "input system" includes any device, component, system, element or arrangement or groups thereof that enable information/data to be entered into a machine. The input system 135 can receive an input from a vehicle occupant (e.g., a driver or a passenger). Any suitable input system 135 can be used, including, for example, a keypad, display, touch screen, multi-touch screen, button, joystick, mouse, trackball, microphone and/or combinations thereof.

The vehicle 100 can include an output system 136. An "output system" includes any device, component, system, element or arrangement or groups thereof that enable information/data to be presented to a vehicle occupant (e.g., a person, a vehicle occupant, etc.). The output system 136 can present information/data to a vehicle occupant. The output system 136 can include a display. Alternatively or in addition, the output system 136 may include one or more earphones and/or one or more speakers. Some components of the vehicle 100 may serve as both a component of the input system 135 and a component of the output system 136.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 155. The autonomous driving module(s) 155 can receive data from the sensor system 120 and/or any other type of system capable of capturing information relating to the vehicle 100 and/or the external environment of the vehicle 100. In one or more arrangements, the autonomous driving module(s) 155 can use such data to generate one or more driving scene models. The autonomous driving module(s) 155 can determine position and velocity of the vehicle 100. The autonomous driving module(s) 155 can determine the location of obstacles, obstacles, or other environmental features including traffic signs, trees, shrubs, neighboring vehicles, pedestrians, etc.

The autonomous driving module(s) 155 can receive, capture, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 155 can determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 155 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 155 can execute various vehicle functions and/or to transmit data to, receive data from, interact with, and/or control the vehicle 100 or one or more systems thereof (e.g., one or more of vehicle systems 140).

The vehicle 100 can include one or more wake-up event determination modules 160. The wake-up event determination module(s) 160 can determine whether one or more wake-up events have occurred. "Wake-up event" includes any event in which a vehicle occupant (e.g., a driver) should be awake or is required to be awake to perform one or more actions. The wake-up event determination module(s) 160 and/or the processor(s) 110 can be configured to analyze data acquired by the sensor system 120 to determine whether there an action of a human occupant is needed.

The wake-up event determination module 160 can determine any suitable wake-up event. For instance, in one or more arrangements, the wake-up event can be related to refueling of the vehicle 100. Refueling means that fuel (e.g., gasoline) should be added to the vehicle 100 and/or the vehicle 100 should be recharged (e.g., for an electric vehicle or hybrid vehicle). The wake-up event determination module 160 can determine whether a wake-up event has occurred in any suitable manner, now known or later developed.

In one or more arrangements, it can be determined that a wake-up event has occurred if a current vehicle charge level, amount, and/or quantity is determined to be below a predetermined threshold charge level, amount, and/or quantity. For instance, the wake-up event determination module 160 can analyze data acquired by the charge sensor(s) 123. As an example, the wake-up event determination module 160 can compare data acquired by the charge sensor(s) 123 to a predetermined threshold charge level, amount, and/or quantity. In one or more arrangements, it can be determined that a wake-up event has occurred if a determined current vehicle fuel level, amount, volume, and/or quantity is determined to be below a predetermined threshold fuel level. For instance, the wake-up event determination module 160 can analyze data acquired by the fuel sensor(s) 122. As an example, the wake-up event determination module 160 can compare data acquired by the fuel sensor(s) 122 to a predetermined threshold fuel level, amount, volume, and/or quantity. However, it will be understood that arrangements herein are not limited to these examples.

In one or more arrangements, the wake-up event determination module 160 and/or other module(s) can determine a required fuel level to complete a planned vehicle path. Such a determination can be made at any suitable point in time, including, for example, before vehicle travel begins or at any point during vehicle travel. The determination can be performed continuously, periodically, and/or even randomly. The wake-up event determination module 160 and/or other module(s) can determine, based on input from the one or more sensors of the sensor system 120, a current fuel level for the vehicle 100. If the current fuel level is below the required fuel level, the wake-up event determination module 160 and/or other module(s) can identify one or more refueling stations. The wake-up event determination module 160 and/or other module(s) can identify one or more refueling stations using, for example, the refueling data 118.

In one or more arrangements, the wake-up event determination module 160 and/or other module(s) can cause an indication to be presented to an occupant of the vehicle 100 requesting selection of one of the identified refueling stations. In one or more arrangements, if a refueling station selection is not received from the occupant, the wake-up event determination module(s) 160, the autonomous driving module(s) 155, other module(s), and/or the processor(s) 110 can automatically select one of the identified refueling stations and can cause the vehicle 100 to automatically drive to the selected refueling station. In one or more arrangements, if a refueling station selection is not received from the occupant, the wake-up event determination module 160, the autonomous driving module(s) 155, other module(s), and/or the processor(s) 110 can determine a critical fuel level. If the current fuel level is below the critical fuel level, the wake-up event determination module 160, the autonomous driving module(s) 155, other module(s), and/or the processor(s) 110 can send a command to one or more vehicles systems to drive the vehicle 100 to one of the refueling stations. Such a command can be sent automatically without driver input or approval. The wake-up event determination module 160, the autonomous driving module(s) 155, other module(s), and/or the processor(s) 110 other module(s), and/or the processor(s) 110 can determine the current fuel or charge level, the required fuel or charge level for the vehicle 100 to traverse a planned vehicle path, and a critical fuel or charge level below which the vehicle 100 would be at risk for running out of fuel or charge before, for example, reaching either the destination of the planned vehicle path or a refueling or recharging station proximate to the planned vehicle path.

While arrangements described herein will be described in connection with refueling, it will be understood that arrangements are not limited to the refueling. As another example, the wake-up event can be the vehicle 100 reaching its destination. Still another example, the wake-up event can be whether there is a sleeping child left alone in the vehicle 100.

The vehicle 100 can include one or more occupant identification modules 165. The occupant identification module(s) 165 determine the presence of and/or identity of a vehicle occupant (e.g., the driver and/or passenger(s)). In one or more arrangements, the determination of the identity of a vehicle occupant can be useful in determining whether the particular occupant is sleeping, as the human sleep characteristics data 117 can include one or more sleep profiles specific to the particular individual. In one or more arrangements, the occupant identification module(s) 165 can include one or more biometric identification systems, including, for example, retinal, iris, facial, palm, fingerprint, voice and/or other biometric recognition technologies to identify the driver. The occupant identification module(s) 165 can process data acquired by one or more of the occupant sensors 125.

In one or more arrangements, the occupant identification modules 165 can determine the identity of the driver based on the weight of a person sitting in the driver seat and/or a pressure profile of a person sitting in the driver seat. In such case, the sensor system 120 and/or the one or more occupant sensors 125 can include a weight sensor and/or a pressure sensor. In one or more arrangements, the occupant identification modules 165 can determine the identity of the driver based on a seat adjustment profile. Some vehicles can store seat adjustment profiles for one or more drivers of the vehicle. When a particular seat adjustment profile is selected or if a current seat adjustment profile matches a stored seat adjustment profile, then the occupant identification modules 165 can identify the driver based on the seat adjustment profile. In one or more arrangements, the occupant identification modules 165 can determine the identity of the driver based on a name, password, code or other input received from the driver, such as through the input system 135.

The vehicle 100 can include one or more occupant sleeping determination modules 170. The occupant sleeping determination module(s) 170 can analyze occupant data acquired by the one or more occupant sensors 125. More particularly, the occupant sleeping determination module 170 can analyze occupant data acquired by the one or more occupant sensors 125 to determine whether a vehicle occupant (e.g., a driver) is sleeping. Any suitable analysis of the acquired occupant data can be performed. For instance, the acquired occupant data can be compared to human sleep characteristics data 117 included in the data store(s) 115. If the acquired occupant data matches, falls within a range of, above, or below one or more of the human sleep characteristics data 117, then a driver condition associated with such human sleep characteristics data 117 can determined.

The vehicle 100 can include one or more occupant wake-up alert modules 180. If a wake-up event is detected and if a vehicle occupant is determined to be sleeping, the occupant wake-up alert module(s) 180 can cause a wake-up alert to be presented within the vehicle 100. The occupant wake-up alert module(s) 180 can cause any suitable type of wake-up alert to be presented, including, for example, a visual wake-up alert, a audial wake-up alert, a haptic wake-up alert, and/or a climate wake-up alert, just to name a few possibilities. As will be described in greater detail herein. The occupant wake-up alert module(s) 180 can be operatively connected to one or more alert systems 190 to cause the wake-up alert to be presented.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more mechanisms, devices, elements, components, systems, and/or combination thereof, now known or later developed.

The processor(s) 110, the autonomous driving module(s) 155, and/or other module(s) can be operatively connected to communicate with the various vehicle systems 140 and/or individual components thereof. For example, returning to FIG. 1, the processor(s) 110 and/or the autonomous driving module(s) 155 can be in communication to send and/or receive information from the various vehicle systems 140 to control the movement, speed, maneuvering, heading, direction, etc. of the vehicle 100. The processor(s) 110 and/or the autonomous driving module(s) 155 may control some or all of these vehicle systems 140 and, thus, may be partially or fully autonomous.

For instance, when operating in an autonomous mode, the processor(s) 110 and/or the autonomous driving module(s) 155 can control the direction and/or speed of the vehicle 100. The processor(s) 110 and/or the autonomous driving module(s) 155 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 150 to modify, adjust and/or alter one or more of the vehicle systems 140 or components thereof to responsive to receiving signals or other inputs from the processor(s) 110 and/or the autonomous driving module(s) 155. The one or more actuators 150 can include motors, pneumatic actuators, hydraulic pistons, relays, solenoids, and/or piezoelectric actuators, just to name a few possibilities.

According to arrangements herein, the vehicle 100 can be configured to awaken a vehicle occupant (e.g., the driver and/or other passenger) upon detection of a wake-up event. For instance, the vehicle 100 can be configured to provide a wake-up alert. The wake-up alert can be output or presented within the vehicle 100. The wake-up alert can be presented at any suitable time. The wake-up alert can be presented immediately when both a wake-up event is detected and the vehicle occupant is determined to be sleeping. Alternatively or in addition, the wake-up alert can be presented at a subsequent time. For example, when the vehicle arrives at a selected refueling station or other destination. As another example, the wake-up alert can be presented when an action by the vehicle occupant is required.

The wake-up alert can have any suitable form. For instance, the wake-up alert can be a visual wake-up alert, an audial wake-up alert, a haptic wake-up alert, a climate wake-up alert and/or combinations thereof, just to name a few possibilities. "Visual wake-up alert" is any output that is perceptible to the human sense of sight. "Audial wake-up alert" is any output that is perceptible to the human sense of hearing. "Haptic wake-up alert" is any output that is perceptible to the human sense of touch. "Climate wake-up alert" is any output using one or more climate control systems of a vehicle. The processor(s) 110 and/or the occupant wake-up alert module(s) can be operatively connect to one or more alert systems 190 to cause a wake-up alert to be presented within the vehicle 100.

Various non-limiting examples of such wake-up alerts will now be described. The visual wake-up alert can be presented to the vehicle occupant (e.g., the driver) using one or more of the alert systems 190, such as, for example, one or more wake-up lights 193. The wake-up light(s) 193 can be any suitable type of light. The wake-up lights 193 can be lights included as a part of some other vehicle system, or the wake-up lights 193 can be dedicated to providing a wake-up alert to a vehicle occupant. The wake-up light(s) 193 can be positioned and/or oriented toward a face of a vehicle occupant. Alternatively or in addition, the position and/or orientation of the one or more wake-up lights 193 can be adjustable. For instance, the processor(s) 110 and/or one or more module(s) can cause an actuator to adjust the position and/or orientation of the one or more wake-up lights 193. In one or more arrangements, the orientation of the one or more wake-up lights 193 can be automatically adjusted by the vehicle based on a detected position of a face of a vehicle occupant.

One or more characteristics of the light energy output by the wake-up light(s) 193 can be altered and/or varied. Examples of such one or more characteristics can include color, brightness, mode (e.g., on, flashing, etc.), intensity, and/or wavelength, just to name a few possibilities. The one or more characteristics of the light energy output can be altered and/or varied based on the wake-up event, the severity of the wake-up event, the imminence of the wake-up event, the urgency of the wake-up event, and/or the degree to which a vehicle occupant's attention and/or involvement is needed. For instance, when the wake-up event is related to a fuel level of the vehicle 100, the intensity of the light energy output by the one or more wake-up lights 193 may be increased as the fuel level continues to decline.

The audial wake-up alert can be presented to the vehicle occupant (e.g., the driver) using one or more of the alert systems 190. For instance, the audial wake-up alert can be presented on one or more of speakers 196 (FIG. 3) of the radio 195 or other audio system. The audial wake-up alert can have any suitable form. For instance, the audial wake-up alert can be a sound and/or a message (e.g., word(s), phrase(s), and/or sentence(s)).

Figure 5:
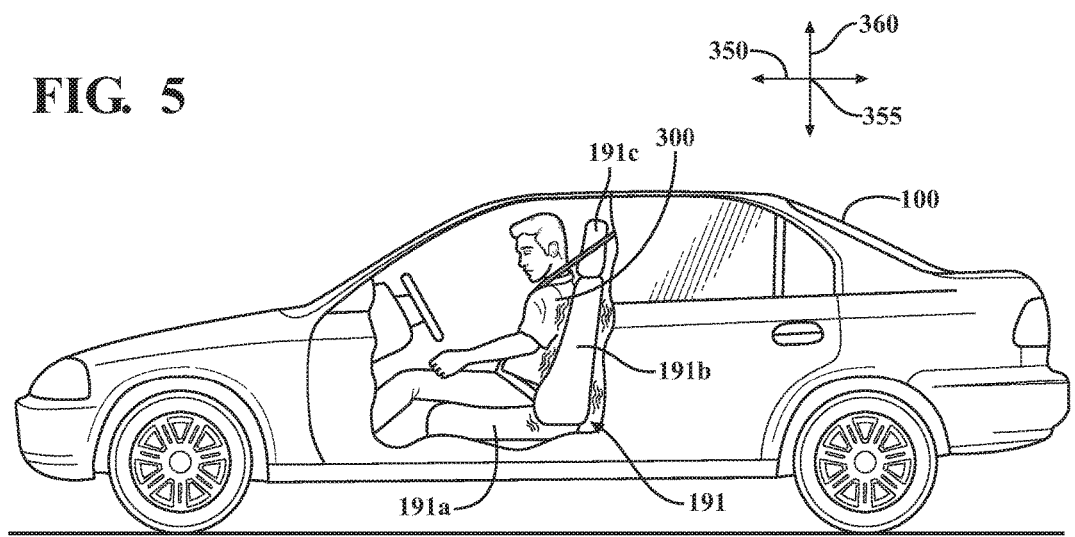
FIG. 5 is an example of a haptic wake-up alert being presented within a vehicle.

The haptic wake-up alert can be presented to the vehicle occupant (e.g., the driver) using one or more of the alert systems 190. For example, a haptic wake-up alert to be presented by the vehicle seat 191. The vehicle seat 191 can include at least a base portion 191*a* (FIG. 5). In one or more arrangements, the one or more vehicle seats 191 can include a back portion 191*b* (FIG. 5). The vehicle seat 191 can include one or more arm rests and/or a headrest 191*c* (FIG. 5). The vehicle seat(s) 191 or portion(s) thereof can be configured to be movable in a plurality of directions, such an in a longitudinal direction 350, a lateral direction 355, and/or an elevational direction 360 (see FIG. 5). For instance, one or more user control elements can be provided to enable a user to selectively change the position of the base portion 191*a*, the back portion 191*b*, the arm rest, and/or the headrest 191*c*. Alternatively or in addition, one or more portions of the vehicle seat(s) 191 can be adjusted manually. The vehicle seat 191 can be configured for one or more different manners of movement. For instance, one or more of the vehicle seats 191 can be configured for pivoting, tilting, sliding, rotational, linear, curvilinear, rectilinear, reciprocal, random, oscillation, and/or twisting motions, or any combinations thereof.

The alert systems 190 can include one or more vehicle seat actuators 192 operatively connected to the vehicle seat 191. The vehicle seat actuator(s) 192 can be any element or combination of elements operable to modify, adjust and/or alter a position and/or aspect of a vehicle seat responsive to receiving signals or other inputs from the processor(s) 110 and/or the occupant wake-up alert module(s) 180. The one or more vehicle seat actuators 192 can include motors, pneumatic actuators, hydraulic pistons, relays, solenoids, and/or piezoelectric actuators, just to name a few possibilities.

The haptic wake-up alert can have any suitable form. For instance, the haptic wake-up alert can be presented by causing a vibration of the vehicle seat 191 or one or more portions thereof (e.g., the base, the back, the headrest, etc.). However, it will be understood that the haptic wake-up alerts are not limited to vibrations. Indeed, the haptic alert could be provided by other movement of the vehicle seat 191. It will also be understood that the haptic wake-up alert is not limited to being presented by the vehicle seat 191.

One or more characteristics of the haptic wake-up alert can be altered and/or varied. Examples of such one or more characteristics can include haptic strength, frequency, location, and/or type of haptic output. The one or more characteristics of the haptic wake-up alert can be altered and/or varied based on the wake-up event and/or the severity and/or imminence of the wake-up event.

The climate control wake-up alert can be presented to the vehicle occupant (e.g., the driver) using one or more climate control systems 194 of the alert systems 190. The climate control system(s) 194 can cause heated, cooled, and/or ambient air to be supplied to a passenger compartment of the vehicle 100. Such air can pass through vents, ducts, louvers, and/or other outlet structures. The vents can be positioned and/or oriented toward a face of a vehicle occupant. Alternatively or in addition, the position and/or orientation of the vents, ducts, louvers, and/or other outlet structures can be adjustable. In one or more arrangements, the position and/or orientation of the one or more vents, ducts, louvers, and/or other outlet structures can be automatically adjusted by the vehicle based on a detected position of a face or other body portion of a vehicle occupant using, for example, one or more occupant sensors 125. The climate control system(s) 194 can include any heating, ventilation and/or air conditioning (HVAC) system, now known or later developed.

One or more characteristics of the air supplied by the climate control system(s) 194 can be altered and/or varied. Examples of such one or more characteristics can include temperature, intensity, mode, and/or duration, just to name a few possibilities. The one or more characteristics of the air supplied by the climate control system(s) 194 can be altered and/or varied based on the wake-up event, the severity of the wake-up event, the imminence of the wake-up event, the urgency of the wake-up event, and/or the degree to which a vehicle occupant's attention and/or involvement is needed. For example, the air supplied by the climate control system(s) 194 can be set to maximum cold, maximum hot, and/or alternated between hot and cold temperatures.

It will be appreciated that any combination of the above types of wake-up alerts and/or other types of wake-up alerts can be provided. For instance, a visual wake-up alert and an audial wake-up alert can be used in combination in any suitable manner.

Figure 2:
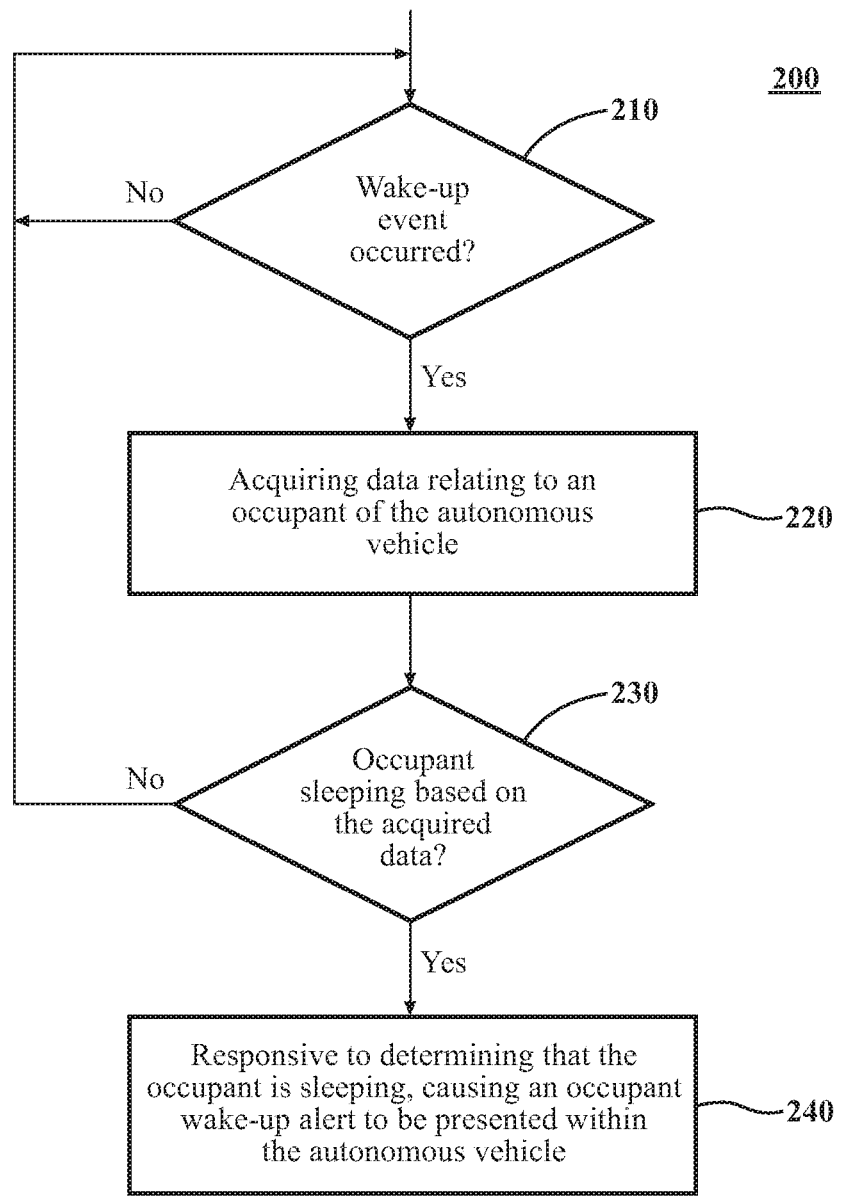
FIG. 2 is an example of a method of presenting a wake-up alert to a sleeping vehicle occupant when a wake-up event is determined to have occurred.

Now that the various potential systems, devices, elements and/or components have been described, various methods of using such systems, devices, elements and/or components will now be described. Referring now to FIG. 2, an example of a method 200 of alerting a sleeping occupant of a vehicle is shown. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, it can be determined whether a wake-up event has occurred. Such a determination can be made continuously, periodically, irregularly, or even randomly. Such a determination can be made in real-time. Such a determination can be made by the wake-up event determination module(s) 160 and/or the processor(s) 110. Such a determination can be made using data acquired by the sensor system 120 (e.g., one or more vehicle sensors 121). If a wake-up event is detected, the method 200 can continue to block 220. If a wake-up event is not detected, the method 200 can end, or the method 200 can return to block 210.

At block 220, data relating to a vehicle occupant can be acquired. For instance, one or more occupant sensors 125 of the sensor system 120 can be used to acquire data relating to the vehicle occupant, who may be the driver or other passenger of the vehicle 100. In one or more arrangements, the data relating to the vehicle occupant can be acquired automatically. In one or more arrangements, the sensor data relating to the vehicle occupant can be acquired with or without notice to the vehicle occupant(s). The method 200 can continue to block 230.

At block 230, it can be determined whether the vehicle occupant is sleeping based on the acquired data relating to the vehicle occupant. Such a determination can be performed by the occupant sleeping determination module(s) 170 and/or the processor(s) 110. The determination can be made in any suitable manner including any of those described above in connection with the occupant sleeping determination module(s) 170. If it is determined that the vehicle occupant is sleeping, the method 200 can continue to block 240. If it is determined that the vehicle occupant is not sleeping, the method 200 can end, or the method 200 can return to block 210 or any other block of the method 200.

At block 240, responsive to determining that the vehicle occupant is sleeping, an occupant wake-up alert can be caused to be presented within the vehicle. In one or more arrangements, the occupant wake-up alert module(s) 180 and/or the processor(s) 110 can cause the vehicle 100 to implement the wake-up alert. The occupant wake-up alert module(s) 180 and/or the processor(s) 110 can be operatively connected to one or more of the alert systems 190 to implement the wake-up alert. The wake-up alert can be presented in any suitable manner and in any suitable form (e.g., audial, visual, haptic, etc.). The wake-up alert can be varied in one or more respects (e.g., intensity, duration, frequency, etc.) to indicate the nature of the wake-up event, the severity of the wake-up event, the imminence of the wake-up event, the urgency of the wake-up event, and/or the degree to which a vehicle occupant's attention and/or involvement is needed.

The method 200 can end. Alternatively, the method 200 can return to block 210. As a further alternative, the method 200 can include additional and/or alternative blocks (not shown). It should be noted that blocks of the method described above can be occur at any suitable time. For instance, one or more of the blocks 210, 220, 230, 240 can occur in real-time as the vehicle 100 travels along a travel route. As another example, one or more of the blocks 210, 220, 230, 240 can occur once the destination of current vehicular travel is reached or after a segment of the travel route is completed.

A non-limiting example of the operation of the vehicle 100 and/or the method 200 will now be described in relation to FIG. 3-6. For purposes of this example, the wake-up event can be related to the refueling of the vehicle 100. More particularly, the wake-up event can be the fuel level of the vehicle 100 falling below a predetermined wake-up fuel level threshold (e.g., ¼ of a tank, ⅛ of a tank, etc.). Also, the vehicle 100 can have a single vehicle occupant 300.

The vehicle 100 can be traveling in an environment. The vehicle 100 can have a gasoline engine, and the vehicle 100 can have a fuel tank 105 for storing gasoline. The vehicle 100 can be a highly-automated, autonomous vehicle. The vehicle 100 can be following a planned path between an origin and a destination. As the vehicle 100 travels along its planned path, the vehicle 100 can sense the external environment using the environment sensor(s) 124. The vehicle 100 can also sense one or more aspects about itself using the vehicle sensor(s) 121. For example, the vehicle 100 can acquire data about the level of gasoline in the fuel tank 105 using the fuel sensor(s) 122.

Since the vehicle 100 is highly automated in this example, the driver may not need to pay attention to the vehicle operation. In some instances, the driver may fall asleep while the vehicle travels to its destination. During such travel, the vehicle 100 can determine whether the wake-up event has occurred. For example, the vehicle 100 can detect the fuel level in the fuel tanks(s) 105. The detected fuel level can be compared to the predetermined fuel level threshold. It is determined that the wake-up event has occurred if the detected fuel level is below the predetermined fuel level threshold.

In response to determining that the wake-up event has occurred, data relating to the vehicle occupant 300 can be acquired by one or more occupant sensors 125. As an example, one or more cameras 131 can acquire visual data of the vehicle occupant 300. Alternatively or in addition, one or more heartrate sensors 126 can acquire heartrate data of the vehicle occupant 300.

Based on the sensor data relating to the vehicle occupant 300 that is acquired by the one or more occupant sensors 125, the vehicle 100 can determine whether the vehicle occupant 300 is sleeping. Such a determination can be made by, for example, the occupant sleeping determination module(s) 170 and/or the processor(s) 110. For instance, the visual data acquired by the one or more cameras 131 can be analyzed to determine whether the eyes of the vehicle occupant 300 are closed by using any suitable visual data recognition and/or processing technology. Alternatively or in addition, the acquired heartrate data can be analyzed to determine whether the heartrate of the vehicle occupant 300 is below a predetermined heartrate threshold, which can be indicative that the vehicle occupant 300 is sleeping.

In response to determining that the vehicle occupant 300 is sleeping, the occupant wake-up alert module(s) 180 and/or the processor(s) 110 can cause one or more of the alert systems 190 to present a wake-up alert within the vehicle 100. The wake-up alert can be presented in one or more ways. FIGS. 3-6 show various examples of wake-up alerts being presented within the vehicle 100.

Figure 3:
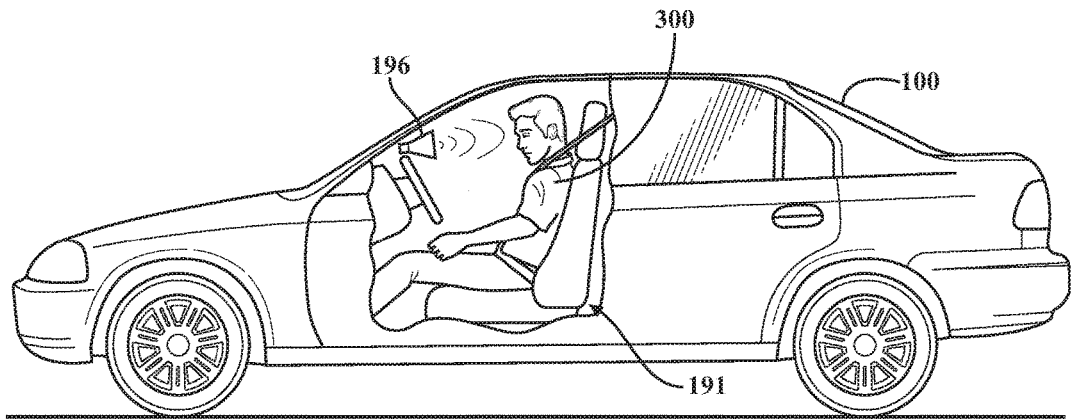
FIG. 3 is an example of an audial wake-up alert being presented within a vehicle.

FIG. 3 shows an example of an audial wake-up alert being presented within the vehicle. In this particular example, the audial wake-up alert can be presented by a speaker 196 of the radio 195 or other audio system of the vehicle 100.

Figure 4:
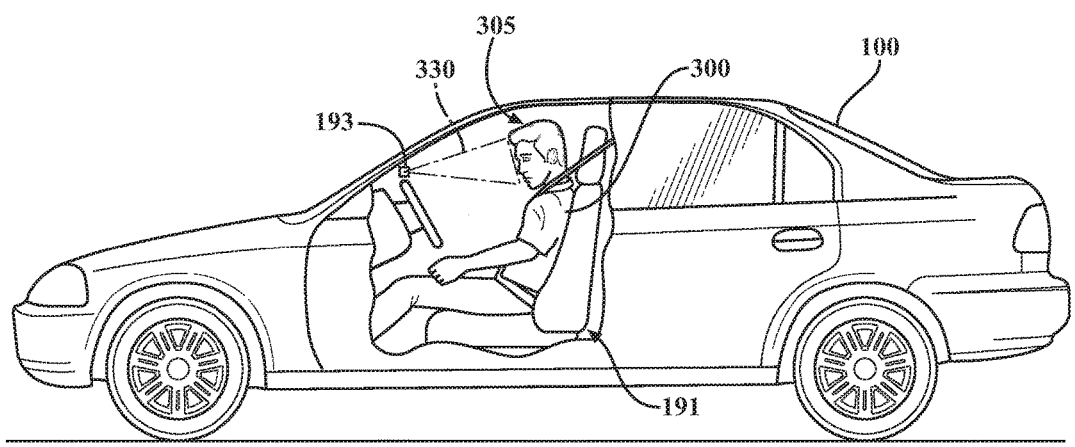
FIG. 4 is an example of a visual wake-up alert being presented within a vehicle.

FIG. 4 shows an example of a visual wake-up alert being presented within the vehicle 100. In this particular example, the visual wake-up alert can be provided by one or more wake-up lights 193. The one or more wake-up lights 193 can be positioned and/or oriented toward a face 305 of the vehicle occupant 300. Alternatively or in addition, the position and/or orientation of the one or more wake-up lights 193 can be automatically adjusted by the vehicle 100 based on a detected position of the face 305 of the vehicle occupant 300. In this way, the one- or more wake-up lights 193 can emit light energy 330 toward the face 305 of the vehicle occupant 300.

FIG. 5 shows an example of a haptic wake-up alert being presented within the vehicle 100. The haptic alert can be a vibration of the vehicle seat 191 or any portion thereof. FIG. 5 shows an example of the back portion 191b of the vehicle seat 191 being vibrated. However, it will be understood that other portions of the vehicle seat 191 (e.g., the base portion 191a, the headrest 191c, and/or armrests) can, alternatively or in addition, be vibrated to awaken the vehicle occupant 300.

Figure 6:
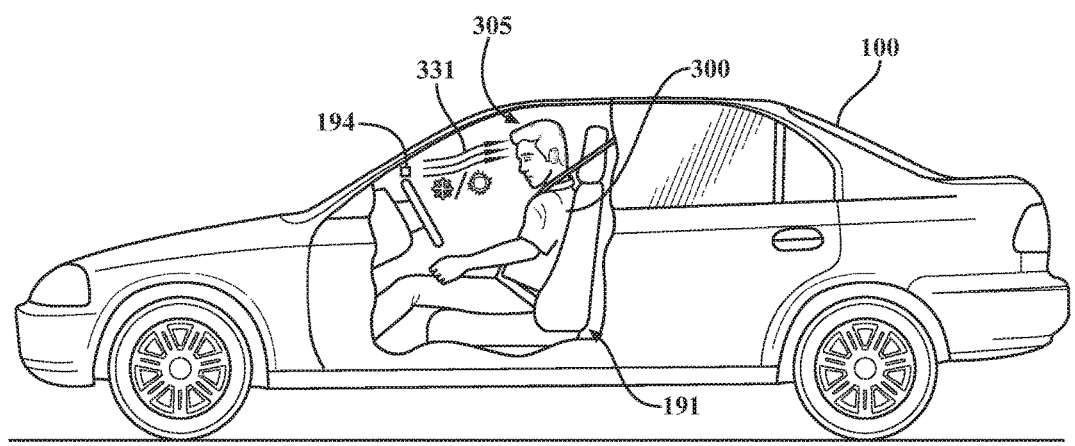
FIG. 6 is an example of a climate wake-up alert being presented within a vehicle.

FIG. 6 shows an example of a wake-up alert using the climate control system(s) 194 of the vehicle 100. One or more output vents, ducts, louvers, and/or other outlet structures of the climate control system(s) 194 can be positioned and/or oriented toward a face 305 of the vehicle occupant 300. Alternatively or in addition, the orientation of the one or more output vents of the climate control system(s) 194 can be automatically adjusted by the vehicle 100 based on a detected position of the face 305 of the vehicle occupant 300. In this way, air 331 can be directed toward the face 305 of the vehicle occupant 300. The climate control system(s) 194 can be configured to blow hot and/or cold air toward the face 305 of the vehicle occupant 300.

While FIGS. 3-6 show different examples of wake-up alerts, it will be understood that the wake-up alert can be any combination of the above-described types of wake-up alerts and/or other types of wake-up alerts. When different types of wake-up alerts are provided, the different types of wake-up alerts may be presented substantially simultaneously, alternatingly, and/or in any other suitable manner. The wake-up alerts can be presented for a predetermined number of times, for a predetermined duration, and/or until the vehicle occupant 300 awakens.

After being awakened, the vehicle occupant 300 can fuel the vehicle 100. For instance, the vehicle 100 can automatically detect a nearby gas stations, such as by using the refueling data 118, the navigation system 147 and/or a mapping application. The vehicle occupant 300 can select one of the gas stations. The vehicle 100 may automatically select one of the gas stations by default or if a selection is not received from the vehicle occupant 300 within a predetermined period of time. The vehicle 100 can operate in an autonomous operational mode so as to drive to the selected gas station. The vehicle occupant 300 can fuel the vehicle 100. After the vehicle 100 is fueled to a desired level, the vehicle 100 can proceed in an autonomous operational mode or other operational mode to a desired destination.

It will be appreciated that arrangements described herein can provide numerous benefits, including one or more of the benefits mentioned herein. For example, arrangements described herein can improve the performance of a vehicle. Arrangements described herein can improve the safety of vehicle operation. Arrangements described herein can provide for enhanced interaction between the vehicle and a human occupant.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of alerting a sleeping occupant of a vehicle, the method comprising:
    determining, using one or more processors, whether a wake-up event has occurred, the wake-up event being related to refueling of the vehicle;
    responsive to determining that the wake-up event has occurred, acquiring, using one or more sensors, data relating to a vehicle occupant;
    determining, using one or more processors, whether the vehicle occupant is sleeping based on the acquired data relating to the vehicle occupant; and
    if it is determined that both the wake-up event has occurred and the vehicle occupant is sleeping, causing, using one or more processors, an occupant wake-up alert to be presented within the vehicle.

2. The method of claim 1, wherein the occupant wake-up alert is a haptic occupant wake-up alert.

3. The method of claim 2, wherein causing the occupant wake-up alert to be presented within the vehicle includes causing the haptic occupant wake-up alert to be presented by vibrating at least a portion of a vehicle seat used by the vehicle occupant.

4. The method of claim 1, wherein the occupant wake-up alert is an audial occupant wake-up alert.

5. The method of claim 4, wherein causing the occupant wake-up alert to be presented within the vehicle includes at least one of:
    activating a vehicle radio, or
    increasing a volume of the vehicle radio to a predetermined output volume.

6. The method of claim 1, wherein the occupant wake-up alert is a visual occupant wake-up alert.

7. The method of claim 6, wherein causing the occupant wake-up alert to be presented within the vehicle includes causing light energy to be emitted from a wake-up light within the vehicle, and wherein the light energy is directed toward a face of the vehicle occupant.

8. The method of claim 1, wherein causing the occupant wake-up alert to be presented within the vehicle includes:
    activating a vehicle climate control system to at least one of a predetermined output level or a predetermined temperature level.

9. The method of claim 1, wherein the wake-up event is a vehicle charge level being below a predetermined threshold charge level.

10. The method of claim 1, wherein the wake-up event is a vehicle fuel level being below a predetermined threshold fuel level.

11. The method of claim 1, wherein the acquired data relating to a vehicle occupant includes a detected heartrate of the vehicle occupant, a seatbelt condition of the vehicle occupant, a head position of the vehicle occupant, an eye condition of the vehicle occupant, or a face condition of a vehicle occupant.

12. A sleeping occupant alert system for a vehicle being operated in an autonomous operational mode, the system comprising:
    one or more sensors configured to acquire data relating to a vehicle occupant;
    a processor operatively connected to the one or more sensors, the processor being programmed to initiate executable operations comprising:
        determining whether a wake-up event has occurred, the wake-up event being related to refueling of the vehicle;
        determining whether a vehicle occupant is sleeping based on the data relating to the vehicle occupant acquired by the one or more sensors; and
        responsive to determining that both the wake-up event has occurred and the vehicle occupant is sleeping, causing an occupant wake-up alert to be presented within the vehicle.

13. The system of claim 12, wherein the occupant wake-up alert is a haptic occupant wake-up alert.

14. The system of claim 13, wherein the haptic occupant wake-up alert is provided by a vehicle seat used by the vehicle occupant.

15. The system of claim 12, wherein the occupant wake-up alert is an audial occupant wake-up alert, and wherein causing the occupant wake-up alert to be presented within the vehicle includes at least one of:
    activating a vehicle radio, or
    increasing a volume of the vehicle radio to a predetermined output volume.

16. The system of claim 12, wherein the occupant wake-up alert is a visual occupant wake-up alert, and wherein causing the occupant wake-up alert to be presented within the vehicle includes emitting light energy directly toward a face of the vehicle occupant.

17. The system of claim 12, wherein causing the occupant wake-up alert to be presented within the vehicle includes:
    activating a climate control system to at least one of a predetermined output level or a predetermined temperature level.

18. The system of claim 12, wherein the wake-up event is a vehicle charge level being below a predetermined threshold charge level.

19. The system of claim 12, wherein the wake-up event is a vehicle fuel level being below a predetermined threshold fuel level.

20. The system of claim 12, wherein the data relating to a vehicle occupant includes a detected heartrate of the vehicle occupant, a seatbelt condition of the vehicle occupant, a head position of the vehicle occupant, an eye condition of the vehicle occupant, or a face condition of a vehicle occupant.

21. The method of claim 1, further including operating the vehicle in an autonomous operational mode, and
wherein causing, using the one or more processors, the occupant wake-up alert to be presented within the vehicle includes causing, using the one or more processers, the occupant wake-up alert to be presented within the vehicle while the vehicle operates in the autonomous operational mode.

22. The method of claim 1, further comprising:
if it is determined that the wake-up event has not occurred or that the vehicle occupant is not sleeping, an occupant wake-up alert is not presented within the vehicle.

* * * * *